United States Patent [19]

Sasahara

[11] Patent Number: 4,951,238

[45] Date of Patent: Aug. 21, 1990

[54] PROCESSOR FOR EXECUTING ARITHMETIC OPERATIONS ON INPUT DATA AND CONSTANT DATA WITH A SMALL ERROR

[75] Inventor: Misayo Sasahara, Tokyo, Japan

[73] Assignee: NEC Corporation, Tokyo, Japan

[21] Appl. No.: 114,975

[22] Filed: Oct. 30, 1987

[30] Foreign Application Priority Data

Oct. 30, 1986 [JP] Japan ............................ 61-259868

[51] Int. Cl.$^5$ ............................ G06F 1/02; G06F 7/72
[52] U.S. Cl. ................................ 364/729; 364/736; 364/746; 364/748
[58] Field of Search ................... 364/729, 748, 748.5, 364/746, 736, 716

[56] References Cited

U.S. PATENT DOCUMENTS

| | | | |
|---|---|---|---|
| 3,997,771 | 12/1976 | Perlowski et al. | 235/156 |
| 4,164,022 | 8/1979 | Rattingoutd et al. | 364/729 |
| 4,231,102 | 10/1980 | Barr et al. | 364/726 |
| 4,484,259 | 11/1984 | Palmer et al. | 364/754 |
| 4,562,553 | 12/1985 | Mattedi et al. | 364/745 |
| 4,777,613 | 10/1988 | Shahan et al. | 364/748 |

OTHER PUBLICATIONS

IEEE Standard for Binary Floating-Point Arithmetic, ANSI/IEEE STD 754-1985, New York, 1985.
John P. Hayes, "Computer Architecture and Organization", McGraw-Hill Book Company, 1978, pp. 240-241.

Primary Examiner—Dale M. Shaw
Attorney, Agent, or Firm—Foley & Lardner, Schwartz, Jeffery, Schwaab, Mack, Blumenthal & Evans

[57] ABSTRACT

A process for carrying out modulo reduction of floating-point data uses a predetermined constant. A subtraction operation of more significant bits of the predetermined constant from a mantissa part of the floating-point data is performed and the subtraction result is normalized. Less significant bits of the predetermined constant are shifted and this result is subtracted from the above normalized data and is then normalized. Thus, a remainder resulting from the modulo reduction is obtained.

6 Claims, 6 Drawing Sheets

FIG. 3

C(REG.1) − π/2 (H)

```
       C90F   DAA2   2168   C236 (H)   --- PREVIOUS C(REG.1)
  -)   C90F   DAA2   2168   C234 (H)   --- π/2 (U)
       ────────────────────────────
       0000   0000   0000   0002 (H)   --- C(REG.1)
```

⇓ NORMALIZING
   (62 BITS LEFT-SHIFT)

```
       8000   0000   0000   0000 (H)   --- DATA A

C4C6   628E   80DC   10D1 (H)   --- π/2 (L)
```

⇓ (64−62) BITS RIGHT-SHIFT

```
       3131   98A2   E037   0734 (H)   --- DATA B
```

DATA A − DATA B

```
       8000   0000   0000   0000 (H)
  -)   3131   98A2   E037   0734 (H)
       ────────────────────────────
       4E0E   675D   1FC8   F8CC (H)   --- DATA C
```

⇓ NORMALIZING
   (1 BIT LEFT-SHIFT)

```
       9D9C   CEBA   3F91   F198 (H)   --- DATA D
```

FIG. 4

$\pi/2(U)$ - DATA B

```
    C90F  DAA2  2168  C234 (H)      π/2(U)
-)  C90F  DAA2  2169  C233 (H)      DATA D
    ─────────────────────────
    0000  0000  0000  0001 (H)
                ⇓ NORMALIZING
                  (63 BITS LEFT-SHIFT)

8000  0000  0000  0000 (H)      DATA E

C4C6  628B  B0DC  CD1  (H)      π/2(L)
                ⇓ (64-63) BIT RIGHT-SHIFT 6263  3145  C06E  0E69 (H)      DATA F
```

DATA E + DATA F

```
    8000  0000  0000  0000 (H)
+)  6263  3145  C06E  0E69 (H)
    ─────────────────────────
    E263  3145  C06E  0E69 (H)      DATA G
                ⇓ NORMALIZING

E263  3145  C06E  0E69 (H)      DATA H
```

PROCESSOR FOR EXECUTING ARITHMETIC OPERATIONS ON INPUT DATA AND CONSTANT DATA WITH A SMALL ERROR

BACKGROUND OF THE INVENTION

The present invention relates to an arithmetic processing unit of floating-point data and, more particularly, to a processor for executing arithmetic operation of a trigonometric function, an inverse trigonometric function, an exponential function and a logarithmic function.

Execution of arithmetic operation of the above-mentioned functions basically includes processing in which input floating-point data is subjected to modulo reduction by use of a particular constant such as a divisor and a series expansion or a so-called CORDIC is carried out with respect to a remainder obtained by the modulo reduction. The constant used in this processing is obtained by rounding an irrational number such as $\pi$, e (exponent), etc. to a finite figure. For this reason, when the binary value of a mantissa part of the input data is close to that of a mantissa part of the particular constant, the more significant bits of the remainder become zero to reduce significant digits thereof. As a result, the product obtained by the series expansion or the CORDIC operation contains a large error.

If the bit length of the input data and the particular constant is increased, the reduction of significant digits of the remainder can be suppressed. However, this requires a large amount of hardware such as an arithmetic logic unit and registers.

SUMMARY OF THE INVENTION

Therefore, an object of the present invention is to provide a floating-point data processor which reduces error in an arithmetic result without requiring a large amount of hardware.

Another object of the present invention is to provide a processor for executing an arithmetic operation of a trigonometric function, an inverse trigonometric function, an exponential function and a logarithmic function in which the decrease in significant digits of a remainder from modulo reduction is prevented.

A processor according to the present invention comprises memory means storing more significant bits of a particular constant having a bit length longer than an input data at a first memory location of a first word address and less significant bits thereof at a second memory location of a second word address, means for carrying out a subtraction operation between input data and the more significant bits of the particular constant to produce first data, means for normalizing the first data to produce second data, means for shifting the less significant bits of the particular constant to have the same digits as the second data, means for carrying out a subtraction operation between the second data and the shifted less significant bits of the particular constant to produce third data, and means for normalizing the third data.

Thus, the bit length of the particular constant is longer than that of the input data. The input data is subjected to modulo reduction by use of the more significant bits of the particular constant, and the first data obtained by the modulo reduction is normalized to produce the second data. Since the first data is normalized, the less significant bits of the particular constant are shifted to make digits thereof coincident with those of the second data. The subtraction operation is carried out between the second data and the shifted less significant bits of the particular constant to produce a third data which is then normalized.

The normalized data is employed as a remainder of the modulo reduction. Accordingly, reduction is significant digits of the remainder is prevented, and an error of the resultant of the arithmetic operation of the series expansion or CORDIC becomes very small.

BRIEF DESCRIPTION OF THE DRAWINGS

The above and other objects, advantages and features of the present invention will be more apparent from the following description taken in conjunction with the accompanying drawings, in which

FIG. 3 is a data changing diagram representing a part of the operation of FIG. 2;

FIG. 4 is a data changing diagram representing another part of the operation of FIG. 2;

DETAILED DESCRIPTION OF THE PREFERRED EMBODIMENT

Figure 1:
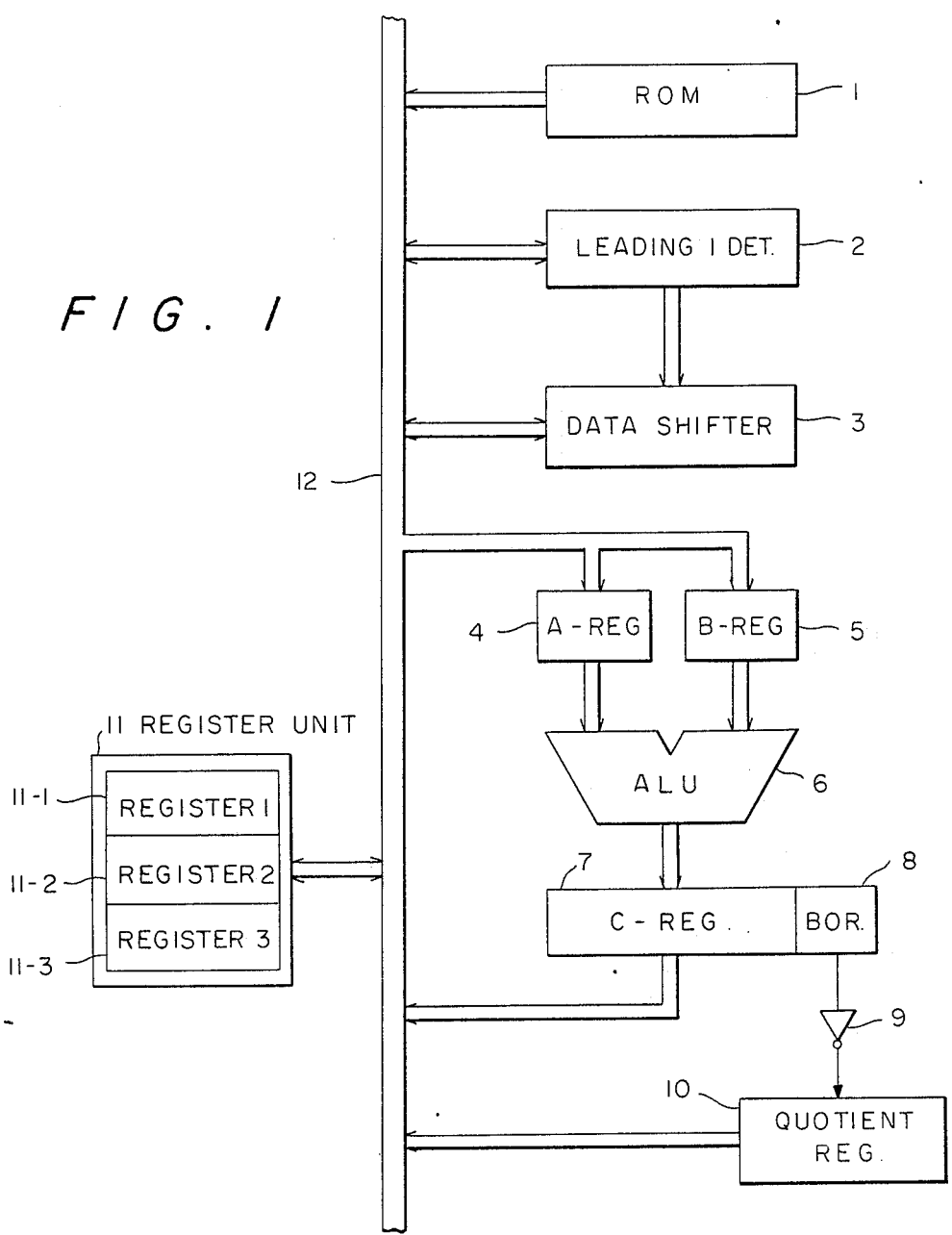
FIG. 1 is a block diagram representing an embodiment of the present invention.

Referring to FIG. 1, a processor according to an embodiment of the present invention includes a read only memory (called hereinafter "ROM") 1 which stores more significant bits and of a mantissa part less significant bits of a particular constant at first and second memory locations of first and second word addresses, respectively, this particular constant being used for modulo reduction. The ROM 1 also stores at a third memory location of a third address the number of bits of the mantissa part of an input data. A leading-1 detector 2 detects a bit position of a leading-1 of a data supplied thereto and supplies detection data to a data shifter 3. This shifter 3 shifts leftward or rightward data supplied thereto by bit numbers determined by the detection data supplied from the leading-1 detector 2. An arithmetic and logic unit (called hereinafter ALU) 6 carries out a subtraction operation or an addition operation between data stored in an A-register 4 and a B-register 5 and supplies the resultant to a C-register 7 having a borrow bit 8. The content of the borrow bit 8 is supplied through an inverter 9 to a quotient register 10. The processor further includes a register unit 11 which has three registers 11-1 to 11-3. The data transmission among the respective blocks is carried out via an internal data bus 12.

A circuit operation of the processor shown in FIG. 1 will be described below by way of example of trigonometric function arithmetic.

The arithmetic algorithm of a trigonometric function is as follows:

(1) Modulo Reduction of Input Data X
R (remainder) = X mod. $\pi/2$
Q (quotient) = Int. (X/($\pi/2$))

-continued (2) Q: even → R' = R
Q: odd → R' = π/2 − R
(3) Calculate Sin R'

More specifically, a input data X is subjected to the modulo reduction by use of a particular constant, i.e. π/2, to obtain a remainder R and a quotient Q. The remainder R is corrected in accordance with the quotient Q. Namely, in a case where the quotient Q is even, the remainder R is employed as a corrected remainder R' as it is, but in a case where the quotient Q is odd, the data of (π/2−R) is employed as the corrected remainder R'. Sin R' is calculated by making use of the series expansion or the CORDIC, and the final correction such as, for example, a sign is performed to obtain Sin X.

When the value of the input data X and/or the remainder R is close to π/2, the significant digits of the corrected remainder R' are reduced, so that the resultant of the series expansion or CORDIC includes a large error.

Figure 2:
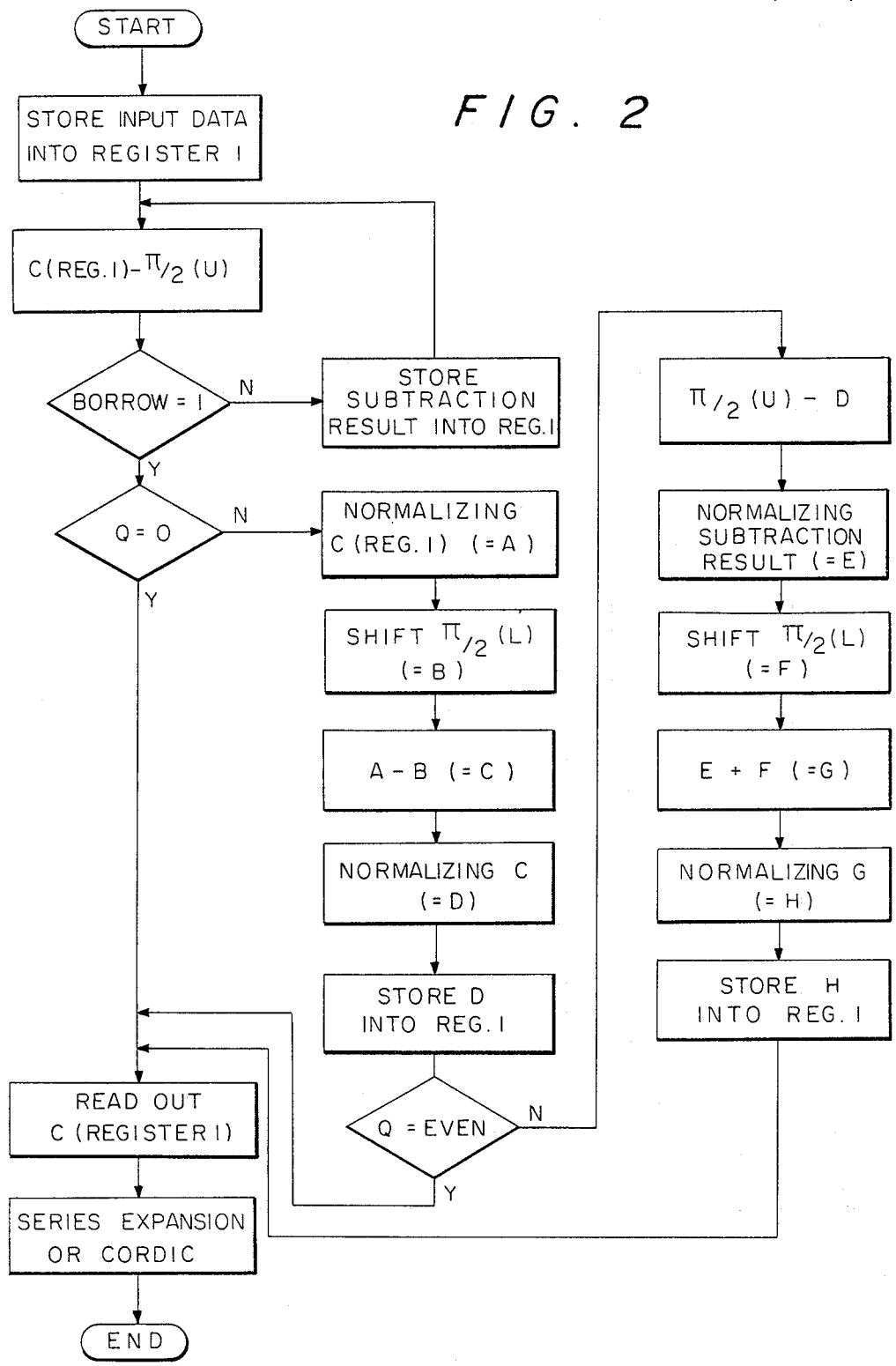
FIG. 2 is an operating flow chart in a case where a processor shown in FIG. 1 is used to carry out arithmetic operation of a trigonometic function.

In order to prevent the occurrence of a large error, the processor shown in FIG. 1 operates in accordance with a flow chart shown in FIG. 2. More specifically, the input data X is supplied as a floating-point data having a sign part of one bit, an exponent part of 15 bits and a mantissa part of 64 bits, and its mantissa part is stored via the internal data bus 12 into the first register 11-1 of the register unit 11. One the other hand, since the value of π/2 is employed as a particular constant for the modulo reduction, the mantissa part thereof is expanded twice (i.e., 128 bits of data), and its more significant bits of data, i.e. π/2(U)=C90F DAA2 2168 C234(H), and its less significant bits data, i.e. π/2(L)=C4C6 628E 80DC 10D1(H), are stored respectively in the first and second word addresses of the ROM 1. The mark (H) indicates hexadecimal representation. The ROM 1 also stores at the third address the number of bits of the mantissa part of the input data, i.e. 40(H)=64. The mantissa part of input data X stored in the first register 11-1 and the more significant bits data π/2(U) stored in the first address of the ROM 1 are read out and then stored into the A-register 4 and B-register 5, respectively, The ALU 6 subtracts the content of the B-register 5 from that of the A-register 4 and stores the subtraction result into the C-register 7. When the value of the mantissa part of the input data X is smaller than the value of the more significant bits of data π/2(U), the borrow bit 8 takes "1". The content of the borrow bit 8 is inverted by the inverter 9 and the inverted data is supplied to the quotient register 10. Therefore, the content of the register 10 is held at "0". That is, when the input data X is in a range between −π/2 and π/2, the borrow bit 8 takes "1" and the register 10 takes "0". As a result, the content of the first register 11-1, i.e. the mantissa part of the input data X, is read out, and the arithmetic operation of the series expansion or the CORDIC is performed with respect to this data.

When the input data X is not in the range between −π/2 and π/2, the borrow bit 8 takes "0". In this case, the subtraction result stored in the C-register 7 is outputted onto the internal data bus 12 and then supplied to the first register 11-1 and the A-register 4. The ALU 6 subtracts the more significant bits of data π/2(U) from the new content of the A-register 4. This sequence of steps is continued until the borrow bit 8 takes "1". When the borrow bit 8 takes "1", the content of the quotient register 10 is judged. Since the content of the register 10 is not "0" at this time, the data stored in the first register 11-1 is normalized.

More specifically, assuming that the data stored in the first register 11-1 just before the borrow bit 8 takes "1" is close to the value of the more significant bits of data π/2(U) and takes a value of "C90F DAA2 2168 C236(H)", as shown in FIG. 3, the subtraction result by the ALU 6 is "0000 0000 0000 0002(H)". This data has been stored into the first register 11-1 when the borrow bit 8 changed from "0" to "1". Therefore, the "0000 0000 0000 0002(H)" is nomalized. For this purpose, the data stored in the first register 11-1 is read out and supplied to the leading-1 detector 2 and the shifter 3. The leading-1 detector 2 detects that the leading-1 of the supplied data is positioned at the sixty-third bit, and hence supplies a shift-data signal of "62" to the shifter 3. The shifter 3 responds to the shift-data signal and shifts leftward the supplied data by 62 bits. As a result, a data A, "8000 0000 0000 0000(H)" shown in FIG. 3, is obtained from the shifter 3 and then stored in the first register 11-1. Thus, the data normalizing is completed. Since the leading-1 detector 2 and the shifter 3 are well known in the art, the detailed constitutions thereof are not repeated here. The processing of the exponent part of an input floating-point number is well known in the art and will not be described in detail in this application.

According to the prior art, the data A is employed as a remainder R and the series expansion or the CORDIC is carried out. Since the number of significant digits of the data A is only one, the processing resultant contains a large error in prior art processors.

In order to prevent this drawback, the processor according to the present embodiment carries out the subtraction operation between the data A and the less significant bits of data π/2(L). At this time, since the digit of the data A is shifted, the digit of the lower bits of data π/2(L) should be coincident with that of the data A. For this purpose, the data stored in the third word address of the ROM 1 and the shift-data obtained by the leading-1 detector 2 are read out and then stored into the A-register 4 and the B-register 5, respectively. The ALU 6 subtracts the content of the B-register 5 from that of the A-register 4, so that the subtraction data "2" is supplied to the shifter 3 as shift-data. The shifter 3 is also supplied with the less significant bits of data π/2(L) and shifts rightward this data by two bits. As a result, a data B taking a value of "3131 98A2 E037 0734(H)" is obtained as shown in FIG. 3 and is stored in the second register 11-2. This data B is then read out and supplied to the B-register 5. On the other hand, the data A stored into the first register 11-1 is read out and then supplied to the A-register 4. The ALU 6 subtracts the data B from the data A. This resultant takes a value of "4E0E 675D 1FC8 F8CC(H)" as shown in FIG. 3 and is stored into the third register 11-3 as a data C. Data normalizing making use of the leading-1 detector 2 and the shifter 3 is carried out with respect to the data C in the same manner as described hereinbefore. As a result, a data D taking a value of "9D9C CEBA 3F91 F198(H)" shown in FIG. 3 is obtained and then stored into the first register 11-1. This data D is employed as a remainder R as a result of modulo reduction.

As mentioned previously, the remainder R should be corrected in accordance with the quotient Q. For this purpose, the content of the quotient register 10 is judged. When the quotient Q is even, The data D is employed as the corrected remainder R'. The arithmetic operation of the series expansion or CORDIC is thereafter carried out. Since all the bits of the data D are significant, the error in the operation result becomes very small.

When the quotient Q is odd, the subtraction of the data D from the value of $\pi/2$ should be performed. For this purpose, the data D stored in the first register 11-1 and the more significant bits of data $\pi/2$U) stored in the ROM 1 are read out and then supplied to the B-register 5 and A-register 4, respectively. The ALU 6 subtracts the data D from the more significant bits of data $\pi/2$(U). Assuming that the data D takes a value of "C90F DAA2 2169 C233(H)" close to the value of the data $\pi/2$(U), as shown in FIG. 4, the subtraction result takes a value of "0000 0000 0000 0001(H)". The normalizing of the subtraction result is performed by making use of the leading-1 detector 2 and the shifter 3, so that a data E is obtained, which takes a value of "8000 0000 0000 0000(H)", as shown in FIG. 4.

According to the prior art, this data E is employed as the corrected remainder R'. For this reason, a large error occurs in prior art processors.

According to the present invention, the less significant bits of data $\pi/2$(L) is added to the data E. However, the digits of the data $\pi/2$(L) should be made coincident with those of the data E before the addition operation. For this purpose, the content at the third word address of the ROM 1 and the shift-data obtained by the leading-1 detector 2 are supplied to the A-register 4 and the B-register 5, respectively. The ALU 6 subtracts the content of the B-register 5 from that of the A-register 4 and supplies the result to the data shifter 3 as shift-data. The shifter 3 is also supplied with the less significant bits of data $\pi/2$(L) and shifts rightward this data by one bit. As a result, a data F taking a value of "6263 3145 C06E 0E69(H)" is obtained, as shown in FIG. 4. The data E and F are stored into the first and second registers 11-1 and 11-2, respectively. These data E and F are read out and supplied to the A-register 4 and the B-register 5, respectively. The ALU 6 adds the data F to the data E. As a result, a data G taking a value of "E263 3145 C06E 0E69(H)" is obtained and stored in the third register 11-3. Normalizing is performed with respect to the data G by use of the leading-1 detector 2 and the data shifter 3. In this case, the leading-1 of the data G is positioned at the first bit, and therefore the normalized data H takes the same value of the data G and is stored into the first register 11-1. Thus, the data H is employed as the corrected remainder R' and the series expansion or the CORDIC is carried out. Since the significant digits of the remainder R' are not reduced, error in the processing result is very small.

Figure 5:
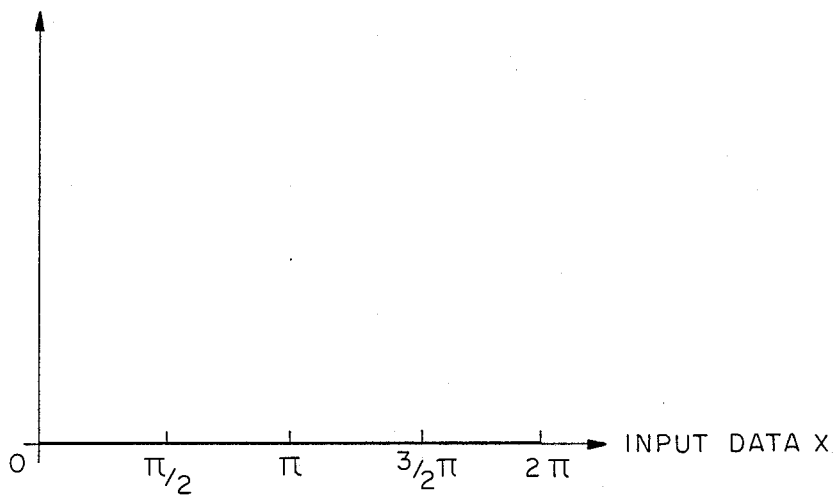
FIG. 5 is a graph representing the number of bits taking error data with respect to an input data X according to the present invention.
Figure 6A:
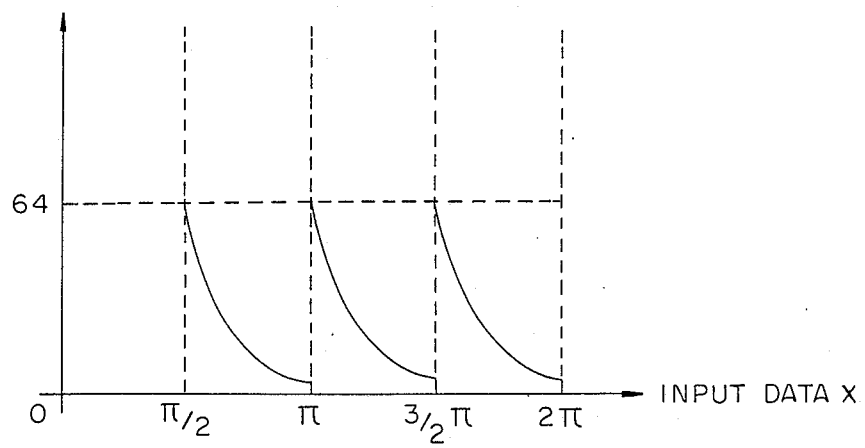
FIGS. 6A and 6B are graphs representing the number of bits taking error data with respect to an input data X according to prior art.
Figure 6B:
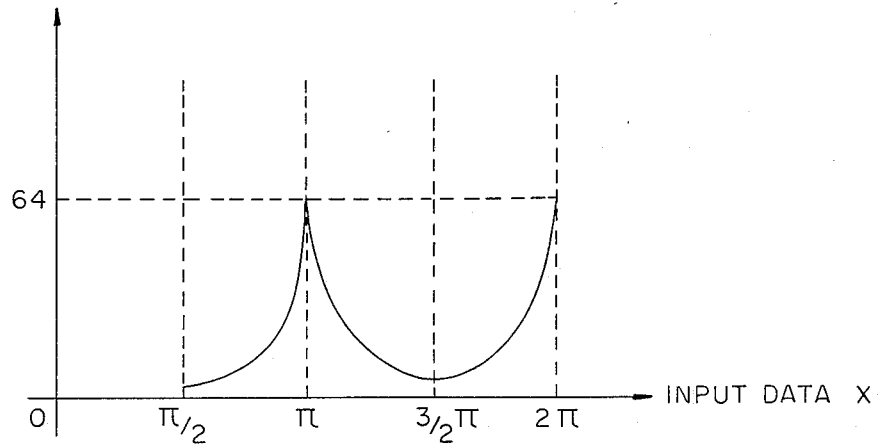

As described above, since the value of the mantissa part of $\pi/2$ is expanded twice in the present embodiment, the number of bits taking error data in the corrected remainder R' is zero as shown in FIG. 5. Moreover, since the bit length of the input data X and the value of $\pi/2$ is not increased substantially, the amount of hardware does not become large. To the contrary, the number of bits taking error data in the remainder R' according to prior art processors is shown in FIG. 6A when the quotient Q is even and in FIG. 6B when the quotient Q is odd, respectively, and a large number of bits take error data when the value of the mantissa part of the input data X is close to multiples of $\pi/2$.

The present invention is not limited to the above-described embodiment, but can be modified and changed without departing from the scope and spirit of the present invention. For example, the value of $\pi/4$ can be employed as a particular constant for the modulo reduction. Since the basic algorithm of an inverse trigonometric function, an exponential function and a logarithmic function is the same as that of the trigonometric function, the arithmetic technique according to the present invention is applicable to those functions.

What is claimed is:

1. A processor comprising:
   memory means for storing more significant bits and less significant bits of a particular constant,
   first arithmetic means for carrying out a subtraction operation of said more significant bits from input data to produce first data,
   first normalizing means for normalizing said first data to produce second data,
   shift means for shifting said less significant bits to align a digit of a most significant bit of said less significant bits to a corresponding digit of said second data,
   second arithmetic means for carrying out a subtraction operation of shifted less significant bits from said second data to produce third data, and
   second normalizing means for normalizing said third data.

2. A processor as claimed in claim 1, wherein said memory means stores said more significant bits at a first memory location having a first memory address and said less significant bits at a second memory location having a second memory address.

3. A processor as claimed in claim 1, wherein a mantissa part of said particular constant has a bit length that is twice a bit length of a mantissa part of said input data.

4. A processor for carrying out modulo reduction of input data by the use of a predetermined constant, said processor comprising:
   first means for storing more significant bits and less significant bits of a mantissa part of said predetermined constant, each of said more significant bits and said less significant bits having a bit length equal to a bit length of a mantissa part of said input data,
   second means for subtracting said more significant bits from data corresponding to said mantissa part of said input data to produce first data,
   third means for detecting a bit position of a leading-1 of said first data to produce first shift-data, fourth means for shifting said first data by a number of bits specified by said first shift-data to produce second data,
   fifth means for shifting said less significant bits by said number of bits specified by said first shift-data and said bit length of said mantissa part of said input data to produce third data,
   sixth means for subtracting said third data from said second data to produce fourth data,
   detecting means for detecting a bit position of a leading-1 of said fourth data to produce second shift-data, and
   seventh means for shifting said fourth data by a number of bits specified by said second shift-data.

5. A processor as claimed in claim 4, wherein said fourth and seventh means respectively shift said first and fourth data in a leftward direction, and said fifth means shifts said less significant bits in a rightward direction.

6. A processor comprising:

memory means for storing more significant bits and less significant bits of a predetermined constant at first and second addresses, respectively, first arithmetic means for subtracting said more significant bits from input data to produce first data, first shift means for shifting said first data until a most significant bit of said first data changes to 1 to produce second data, second shift means for shifting said less significant bits in a direction opposite to a data-shifting direction of said first data to produce third data, second arithmetic means for subtracting said third data from said second data to produce fourth data, and third shift means for shifting said fourth data until a most significant bit of said fourth data changes to 1.

* * * * *